E. G. WHITMORE.
SPLICING MEANS FOR FILMS.
APPLICATION FILED FEB. 7, 1916.

1,255,257.

Patented Feb. 5, 1918.

INVENTOR
Edson G. Whitmore,
By Owen, Owen & Crompton,
His attys.

UNITED STATES PATENT OFFICE.

EDSON G. WHITMORE, OF TOLEDO, OHIO.

SPLICING MEANS FOR FILMS.

1,255,257.  Specification of Letters Patent.  Patented Feb. 5, 1918.

Application filed February 7, 1916. Serial No. 76,850.

*To all whom it may concern:*

Be it known that I, EDSON G. WHITMORE, a citizen of the United States, and a resident of Toledo, in the county of Lucas and State of Ohio, have invented a certain new and useful Splicing Means for Films; and I do hereby declare the following to be a full, clear, and exact description of the invention, such as will enable others skilled in the art to which it appertains to make and use the same, reference being had to the accompanying drawings and to the characters of reference marked thereon, which form a part of this specification.

This invention relates to the splicing of moving picture films. Considerable difficulty has been experienced in the operating and use of moving picture machines, due to the frequent breakage of the films, and it has been the practice, so far as I am aware, when breakage occurs during the running of a film to splice or secure the ends thereof together in a temporary manner by small rings and to later effect a more permanent and satisfactory uniting of the film ends by gluing or cementing together. These methods, however, have not proven satisfactory.

The object of my invention is the provision of a film splicing means, so that when breakage of a film occurs during the displaying of a picture the separated ends thereof can be easily and quickly secured together in a simple, cheap, effective and permanent manner.

Figure 1:
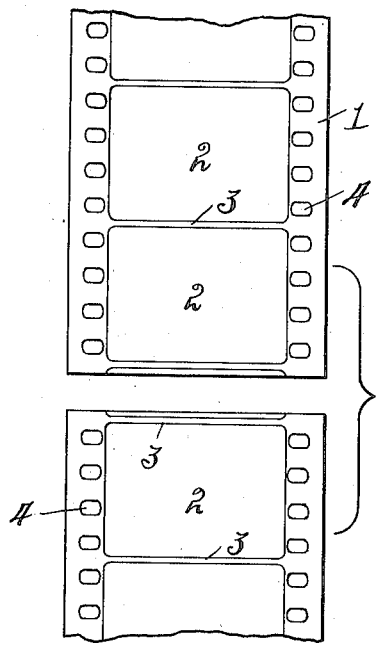
Figure 2:
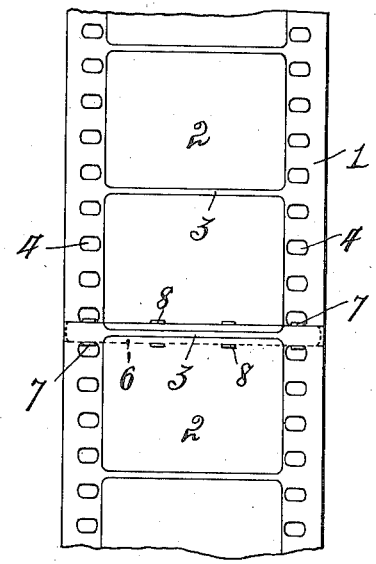
Figure 3:
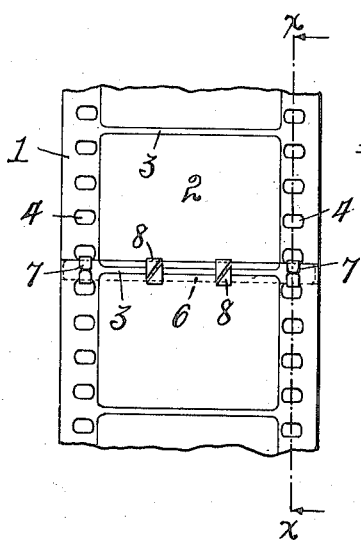
Figure 4:
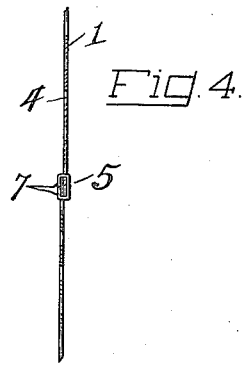
Figure 5:
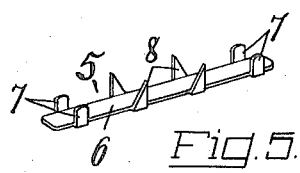

The invention is fully described in the following specification, and a preferred embodiment thereof illustrated in the accompanying drawings, in which, Figure 1 is a plan of the separated end portions of a film cut ready for splicing. Fig. 2 is a similar view thereof with the ends lapped in splicing position and with a splicing member partially engaged therewith. Fig. 3 is a view similar to Fig. 2, with the splice completed. Fig. 4 is a section on the line *x—x* in Fig. 3; and Fig. 5 is a perspective view of the splicing member preferably employed.

Referring to the drawings, 1 designates a film having the customary successively disposed frames 2, with the spacings 3 therebetween, and also having the customary sets of equidistantly spaced perforations 4 in the longitudinally-extending edge portions thereof. The size of the frames 2 is uniform for the films of different moving picture machines, as is also the spacing and size of the perforations 4, the spacing 3 between the frames customarily falling at each end thereof between two perforations, as shown.

In preparing the film ends for a splice, each end is cut straight across at the outer edge of the end frame, with the line of cut falling at the outer edge of the perforation spacing with which the adjacent frame spacing 3 registers, thus causing a proper spacing of the end perforations when the ends are lapped one over the other, as shown in Fig. 2, and at the same time giving a maximum lap without lapping the perforations. In other words, when the film ends are lapped the edge of one end registers with the outer edges of the end perforations 4 of the other end, thus placing the end perforations in successive properly spaced order.

The end portions of the film having been prepared and lapped as above described, they are firmly secured together in this form by a splicing member 5. This member comprises a bar or strip 6 of thin sheet metal or other suitable material, and of a length substantially equal to the width of the film, and this strip is provided adjacent to each end with a set of oppositely-disposed upstanding ears 7 and intermediate its ends with sets of oppositely-disposed upstanding spurs 8. The ears 7 are preferably provided with blunt ends and properly spaced for the ears of each set to be projected through and connect the end perforations 4 of the respective sets, as shown in Fig. 2, after which they are bent inwardly closely down on the film and in lapping relation if of sufficient length for such purpose. The spurs 8 are intended to be forced through the film at the edges of the respective lapped ends, as shown in Fig. 2, and are then lapped inward over the film with their adjacent side edges meeting in a diagonal line, as shown in Fig. 3, the spurs of each set preferably having opposite edges thereof diagonally cut to prevent the spurs from lapping each other when bent over, and also to sharpen the spurs to facilitate a forcing thereof through the film.

The splicing members 5 can be cheaply made by stamping the same from thin sheet metal, and while it is preferable to provide the ears 7 and spurs 8 as shown, the form of these and the arrangement of the spurs may be changed without departing from the spirit of the invention.

The bar 6 of the splicing member 5 is preferably disposed at the coated side of the film, as better results in the operation of a splice film are thereby obtained. It is also preferable to coat the splicing member with a substance or material of a yielding nature, such, for instance, as gelatin or other material of a similar nature, to prevent injury to the film when the splicing member is pressed into contact therewith.

It is found in practice that film ends can be securely fastened together with my method in a simple, quick and durable manner, and without interfering with the meshing of the teeth of the feed wheels with the perforations 4, and that the lap of the film ends and width of the splicing member 5 do not cover the end frames but are disposed at the edges thereof. Other advantages of my splicing method will be apparent to persons skilled in the art.

I wish it understood that my invention is not limited to any specific arrangement, form or construction of the parts, as it is capable of modifications without departing from the spirit of the claims.

Having thus described my invention, what I claim as new, and desire to secure by Letters Patent, is,

1. The combination with the lapped ends of a film having the end perforations thereof properly spaced, of a splicing member comprising a narrow bar-like strip extending substantially from one side edge to the other of the film over the lap and having a plurality of edge projections some of which extend through registering edge perforations of the film and others of which project through the film ends intermediate the edge perforations thereof, said projections being clenched over at their free ends lengthwise of the film and coöperating with said strip to securely unite the film ends.

2. A film splicing member comprising a bar-like strip having a pair of opposed ears adjacent to each end thereof for projecting through edge perforations of films and also having a plurality of edge spurs intermediate said sets of ears for projecting through adjacent end portions of the film.

In testimony whereof, I have hereunto signed my name to this specification.

EDSON G. WHITMORE.